United States Patent [19]

Lockney

[11] Patent Number: 5,328,310
[45] Date of Patent: Jul. 12, 1994

[54] CARGO RESTRAINING TONNEAU NET

[76] Inventor: William R. Lockney, Rte. 5, Box 121-H, DeFuniak Springs, Fla. 32433

[21] Appl. No.: 386

[22] Filed: Jan. 4, 1993

[51] Int. Cl.$^5$ .................... B61D 45/00; B60P 7/04; D04G 1/00
[52] U.S. Cl. .................... 410/97; 410/96; 87/12; 289/1.2
[58] Field of Search .................. 410/96, 97, 98, 99, 410/117, 118; 296/100; 160/332; 87/12, 53; 289/1.2, 16.5, 18.1

[56] References Cited

U.S. PATENT DOCUMENTS

| | | | |
|---|---|---|---|
| 2,705,461 | 4/1955 | Campbell | 410/97 |
| 3,035,475 | 5/1962 | Rinke et al. | 87/12 X |
| 4,158,985 | 6/1979 | Looker et al. | 289/18.1 X |
| 4,900,204 | 2/1990 | Summers | 410/97 |
| 5,040,934 | 8/1991 | Ross | 410/97 |

FOREIGN PATENT DOCUMENTS

| | | | |
|---|---|---|---|
| 4-002534 | 1/1992 | Japan | 410/97 |
| 2196907 | 5/1988 | United Kingdom | 410/96 |

Primary Examiner—Michael S. Huppert
Assistant Examiner—Stephen Gordon
Attorney, Agent, or Firm—Norman B. Rainer

[57] ABSTRACT

A tonneau cargo net is fabricated of a single length of a low-friction rope formed into a knitted type of array having a substantially rectangular perimeter. The net consists of a multitude of non-jamming interlaced junctures having substantially the configuration of an overhand knot. The junctures are spaced apart by intervening portions of the rope and aligned in a series of parallel rows. The junctures in adjacent rows are staggered such that the adjacent junctures of three successive rows are disposed in a diamond-shaped locus.

2 Claims, 3 Drawing Sheets

CARGO RESTRAINING TONNEAU NET

BACKGROUND OF THE INVENTION

1. Field of the Invention

This invention relates to cargo nets, and more particularly concerns a tonneau net adapted to restrain cargo within the bed of a pick-up truck or the like.

2. Description of the Prior Art

Numerous cargo nets have been disclosed in the prior art. Various nets have been employed in attempts to restrain cargo upon pallets, within truck beds, upon ships, and within aircraft. Many vehicles, such as pick-up trucks, boats, trailers and the like include a cargo bed designed to receive and hold cargo of various types. For certain types of cargo, especially light cargo, it is necessary to hold the cargo in the cargo bed while the vehicle is traveling. Otherwise, the cargo may undesirably be blown over the cargo bed as the vehicle travels.

Various means for retaining the cargo in the cargo bed have earlier been disclosed. In one such means, the cargo is merely tied down by ropes, straps, cable, or the like. This particular method, however, is disadvantageous because it is time consuming and often not safe or wholly effective.

A still further type of cargo restraining device is disclosed for example, in U.S. Pat. No. 4,900,204 to Summers. The device comprises a net which is formed of elastic material. This net is then attached to the vehicle so that the net overlies and extends across the cargo bed of the vehicle. A primary disadvantage of the Summers cargo restraining device is that the net is easily damaged not only by the cargo, but also by the environment. Furthermore, since the net is directly attached to the vehicle by hooks or the like, a great deal of stress is imparted to the net at its sites of attachment to the vehicle. This in turn damages the net and results in premature failure of the cargo retaining device.

Another type of cargo restraining device is disclosed in U.S. Pat. No. 5,040,934 to Ross. The Ross device is comprised of a tonneau-type truck bed cover fabricated from a substantially inelastic net having a plurality of longitudinal and transverse strands knotted at their respective intersections. Due to the inelastic nature of this net, its use is limited to the restraining of cargo which fits substantially within the confines of the truck bed. It is incapable of conforming to odd-shaped cargo. The Ross net is further limited to use wherein the truck tailgate is closed, thereby severely limiting the size and nature of cargo which may be restrained.

It is accordingly an object of the present invention to provide a cargo net adapted to restrain cargo within the bed of a pickup truck or the like.

It is another object of the present invention to provide a cargo net of the aforesaid nature which easily conforms to a variety of cargo shapes and sizes.

It is a further object of the invention to provide a cargo net of the aforesaid nature which may be utilized with an open or closed tailgate.

It is yet another object of this invention to provide a cargo net of the aforesaid nature which is durable and amenable to low cost manufacture.

These and other beneficial objects and advantages will be apparent from the following description.

SUMMARY OF THE INVENTION

The above and other beneficial objects and advantages are accomplished with the present invention by a compliant net adapted for use with a pickup truck bed having tie-down hook means, said net having a substantially elongated rectangular perimeter and comprised of a single continuous low-friction rope formed into a multitude of non-jamming interlaced junctures having substantially the configuration of an overhead knot, said junctures being spaced apart by intervening portions of said rope and aligned in a series of parallel rows orthogonally disposed to said perimeter, adjacent rows of said series being staggered such that the adjacent junctures of three successive rows are disposed in a diamond-shaped locus, said junctures being formed by the continuous sequential formation of overhead knots which embrace the intervening portion of the next adjacent row, said rope doubling back at said perimeter for repetitive formation of said junctures.

The construction of the net is similar to the structure of a knitted fabric, and accordingly has the ability to undergo reversible distortions of shape. The ability of the structure to stretch in different directions enables it to conform to irregularly shaped cargo. In preferred embodiments, the perimeter is provided with appendage loops which facilitate attachment of the net to securement means on the cargo-confining walls.

The expression "low-friction" is intended to denote ropes preferably made of continuous synthetic multi-filament strands. Such ropes have much less surface friction than ropes of natural fibers such as hemp, sisal, cotton and other cellulosic materials. It is well known for example in knotting techniques, that certain knots are effective for high friction ropes but not for low friction ropes. In other words, there is ample prior art recognition of distinctions between high-friction and low-friction ropes.

The expression "non-jamming" is intended to denote a knot which, when pulled from both extremities, will not tighten to a substantially irreversibly compacted structure. An overhead knot is not considered a non-jamming knot. However, the interlaced junctures of the net of this invention are non-jammin because they embrace the intervening portions of the adjacent row.

Preferred ropes for use on the practice of the present invention are of braided structure and have a diameter in the range of about $\frac{1}{8}''$ and $\frac{1}{4}''$. Such ropes are preferably fabricated of continuous synthetic fibers such as polypropylene, nylon and polyester. The net may be constructed upon a cylindrical drum having a multiplicity of radially disposed rows of pegs upon which said junctures may be formed.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
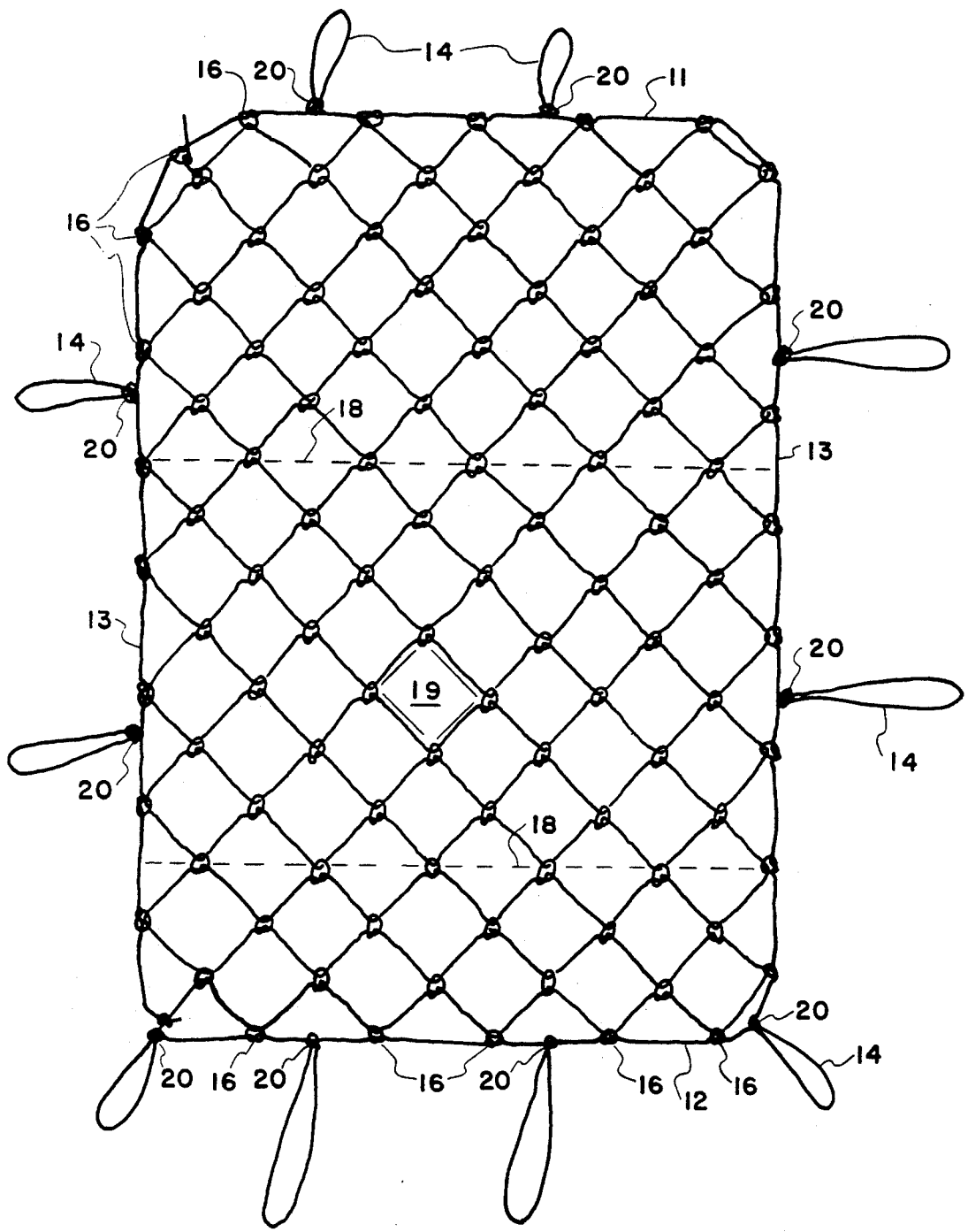
FIG. 1 is a plan view of an embodiment of the net of the present invention.
Figure 2:
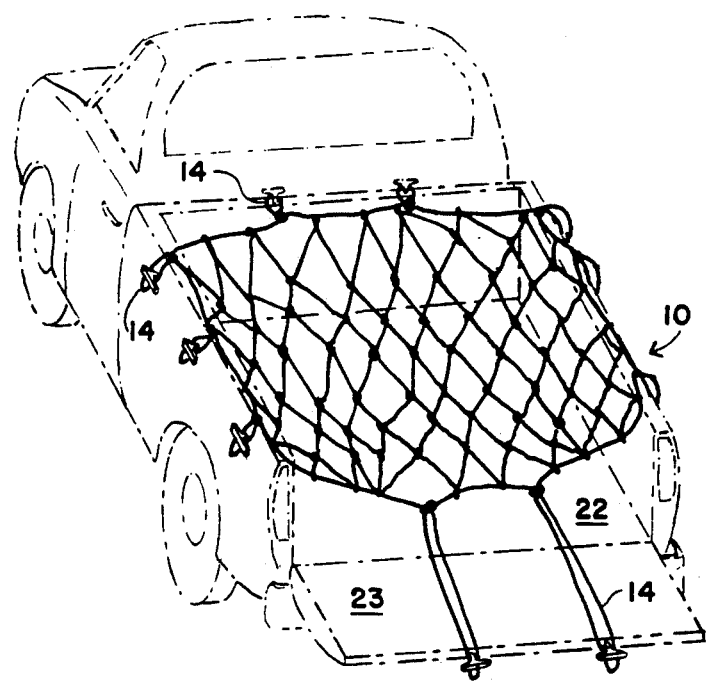
FIG. 2 is a perspective view of the embodiment of FIG. 1, shown emplaced above the cargo space of a pick-up truck.
Figure 3:
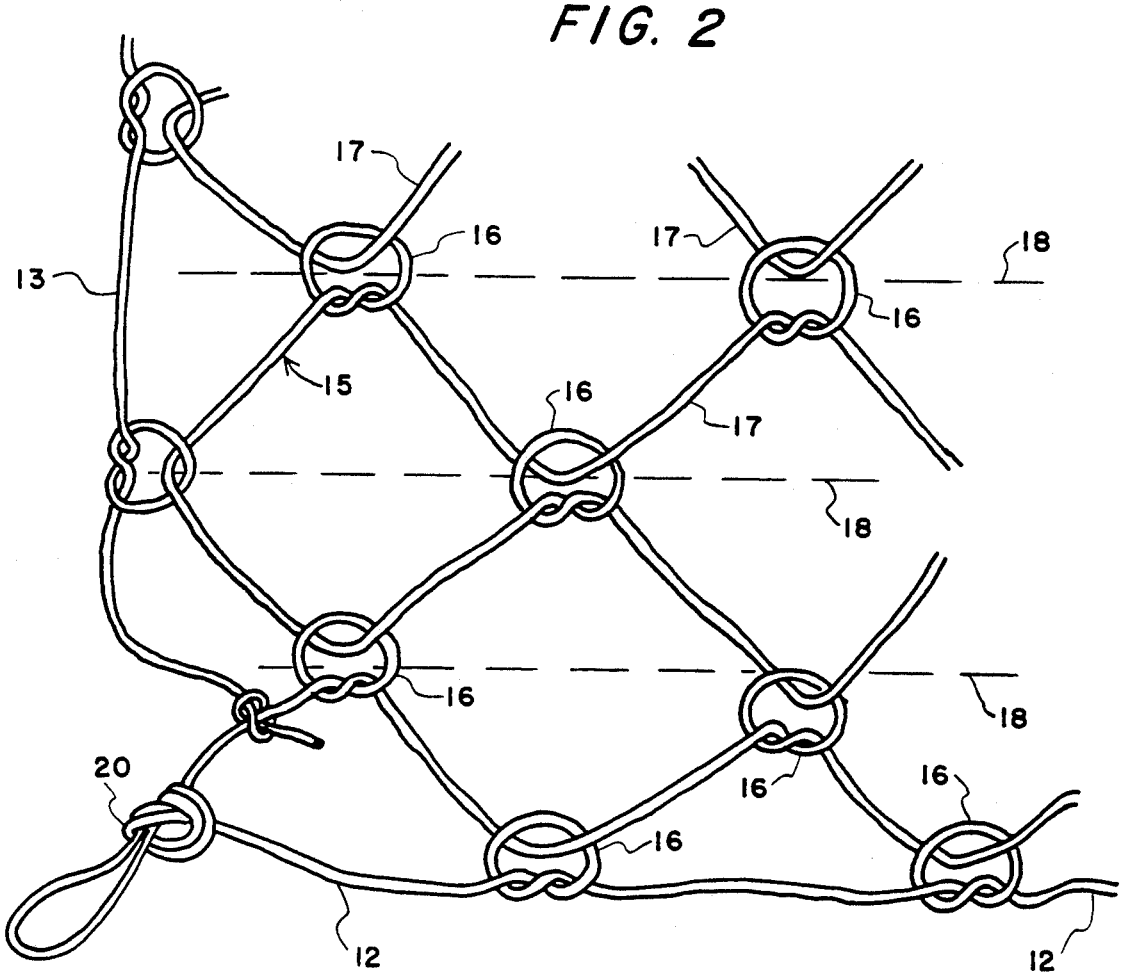
FIG. 3 is an enlarged fragmentary view of the lower left corner of the net of FIG. 1.

Referring to FIGS. 1-3 an embodiment of the net 10 of the present invention is shown having a substantially rectangular perimeter comprised of front end 11, rear end 12 and side edges 13. Various tie-down loops 14 extend outwardly from said perimeter.

Figure 4:
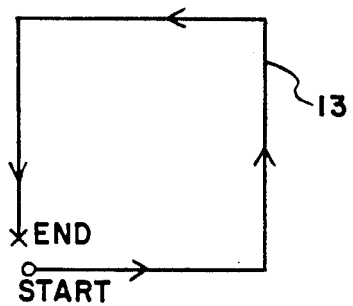
FIG. 4 is a schematic view showing the manner of fabrication of the net of FIG. 1.

The net is fabricated of a single continuous length of braided polyprophylene rope 15. The rope is formed into a multitude of non-jamming interlaced junctures 16 having substantially the configuration of an overhand knot. The junctures, spaced apart by intervening portions 17, are aligned in parallel rows 18 orthogonally disposed to side edges 13. The general path taken by the rope in forming the net is shown in FIG. 4.

It is to be noted that the positioning of the junctures is staggered in adjacent rows such that the adjacent junctures of three successive rows are disposed in a diamond-shaped locus 19. Junctures 16 are formed by the continuous sequential formation of overhand knots which embrace the intervening portions 17 of the next adjacent row. At the lateral extremities of each row, namely at side edges 13, the rope doubles back for repetitive formation of said junctions. Loops 14 are formed in the exemplified embodiment by causing extra length of the rope to form an enlarged loop which is secured at the perimeter by a square knot 20 or equivalent jamming-type knot which will not loosen. Any loop 14 can be removed and relocated anywhere along the perimeter. Some loops 14 can be enlarged at the expense of other loops which are adjusted to smaller size. In such manner, as shown in FIG. 2, the net can cover the cargo area 22 of a pickup truck, while loops 14 on rear end 12 extend to engagement with tailgate 23 disposed on an opened, horizontal position.

Figure 6:
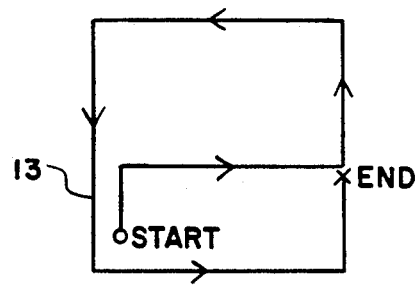
FIG. 6 is a schematic view showing the manner of construction of the net of FIG. 5.
Figure 5:
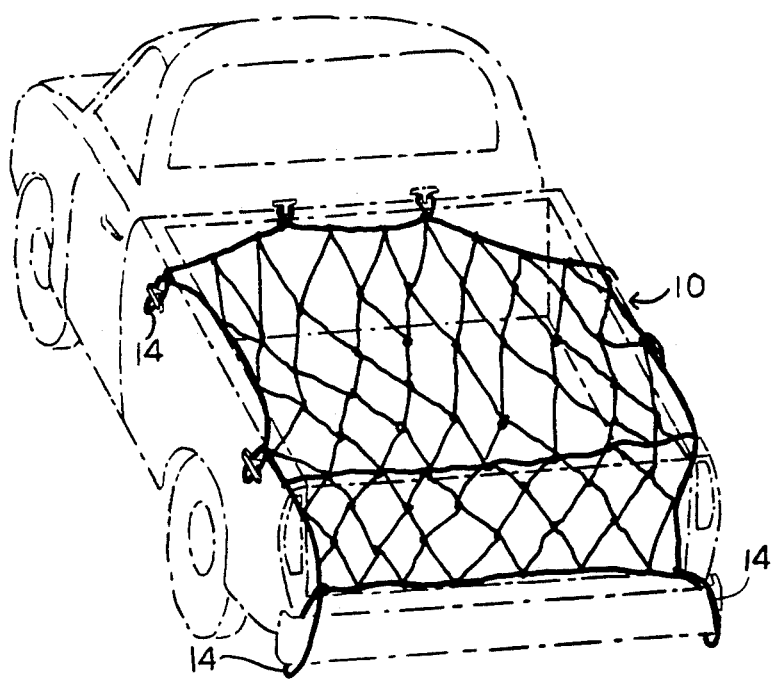
FIG. 5 is a perspective view of an alternative embodiment of the net of the present invention, shown emplaced above the cargo space of a pick-up truck.

In the alternative embodiment of the net shown in FIG. 5, the rear portion of the net is adapted to function essentially as a tailgate which secures the rear of the cargo area in a substantially upright disposition. The general path taken by the rope in forming the net of FIG. 5 is shown in FIG. 6. Although the net of this invention has been exemplified in the form of a tonneau for a pickup truck, other applications are envisaged such as in lifting cargo and constraining objects in non-vehicular uses.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A compliant net having the ability to undergo reversible distortions in shape and adapted for use with a pickup truck bed having tie-down means, said net having a substantially elongated rectangular perimeter and comprised of a single continuous low-friction rope formed into a multitude of non-jamming interlaced junctures comprised of an overhand knot, said junctures being aligned in a series of parallel rows orthogonally disposed to said perimeter, adjacent rows of said series being staggered such that the adjacent junctures of three successive rows are disposed in a diamond-shaped locus, said junctures being formed by the continuous sequential formation of overhand knots which slideably embrace the portion of rope intervening between overhand knots of the next adjacent row, said rope doubling back at said perimeter for repetitive formation of said junctures, said perimeter having appendage loops which facilitate attachment to said tie-down means, said loops being continuous extensions of said rope emergent from jamming knots formed in said perimeter.

2. The net of claim 1 wherein said rope is comprised of a synthetic multi-filament strand.

* * * * *